UNITED STATES PATENT OFFICE.

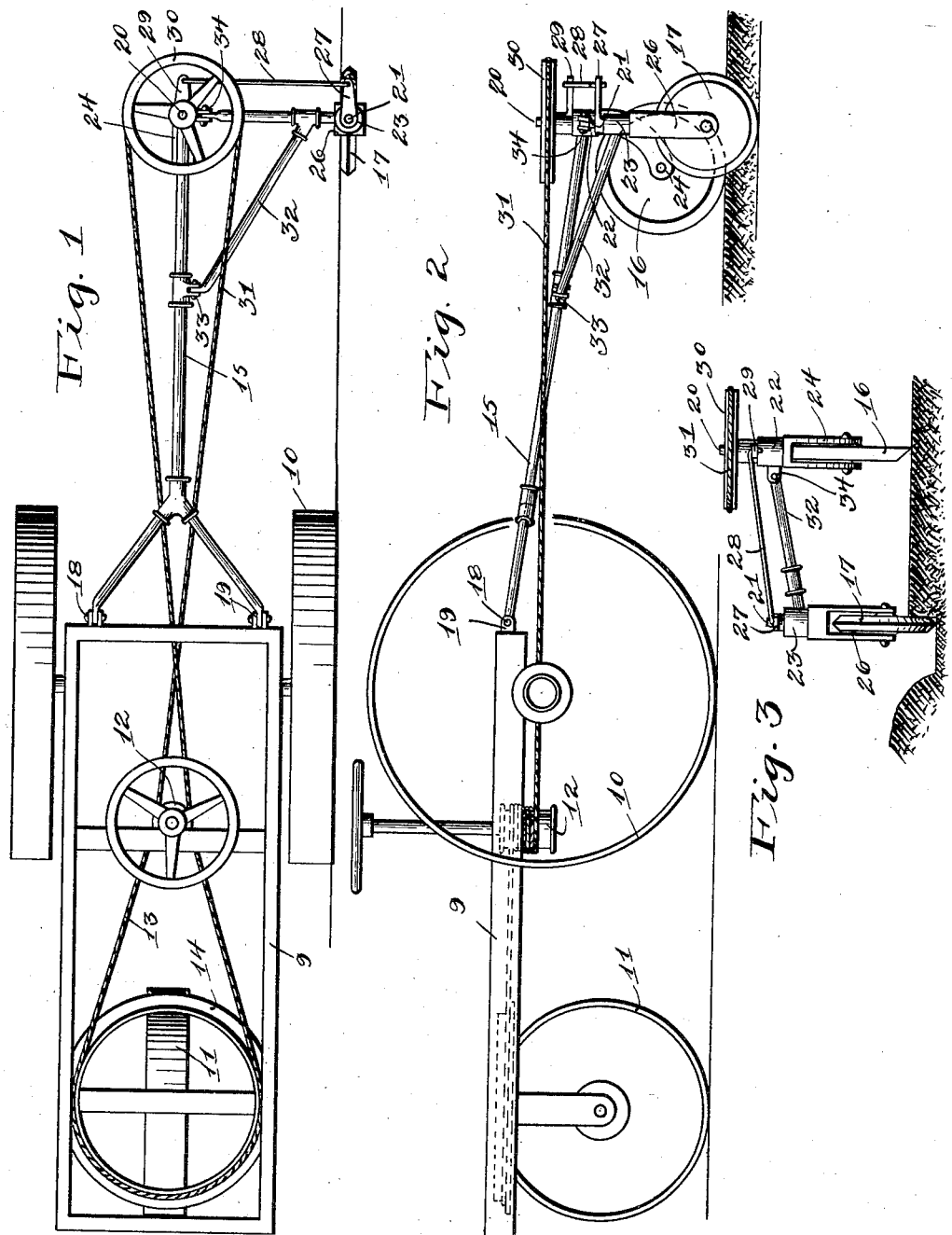

LESLIE S. HACKNEY, OF ST. PAUL, MINNESOTA.

STEERING DEVICE FOR TRACTION-VEHICLES.

1,031,065.   Specification of Letters Patent.   Patented July 2, 1912.

Application filed November 3, 1911. Serial No. 658,433.

*To all whom it may concern:*

Be it known that I, LESLIE S. HACKNEY, a citizen of the United States, residing at St. Paul, in the county of Ramsey and State of Minnesota, have invented new and useful Improvements in Steering Devices for Traction-Vehicles, of which the following is a specification.

My invention relates to an improvement in traction vehicles. Its object is to provide a simple and novel steering device particularly adapted for use in connection with traction vehicles of the type having a rear steering wheel.

A further object is to provide a suitable and efficient steering device having a pilot wheel adapted to travel in a previously formed furrow and coördinated with the steering member of a vehicle to cause said vehicle to travel at a proper distance from and alongside of the furrow.

In the drawings, Figure 1 is a plan view showing my improved steering device in connection with a traction vehicle of the type having a rear steering member; Fig. 2 is a side elevation of the same, and Fig. 3 is an elevation showing the forward end of said device.

Referring to the accompanying drawings, the vehicle proper may comprise the tractor frame 9, supported by the traction wheels 10 and a rear steering wheel 11, said steering wheel being operated by the steering post 12 through the cable 13 and steering drum 14.

My improvement provides a steering attachment for such tractors and comprises a pilot frame 15 which is pivotally connected to the forward end of the tractor frame, a supporting wheel 16 on the forward end of the frame 15, a pilot wheel 17 on said frame adapted to travel in a previously formed furrow, and connecting means between the supporting wheel, pilot wheel and steering drum of the tractor adapted to synchronize the movement of said wheels and the tractor steering wheel.

The pilot frame 15 is pivotally mounted on the pins 18 which are supported in the lugs 19 on the forward end of the tractor frame. This pivotal connection between said frames permits the oscillation of the frame 15 in a vertical plane, but prevents horizontal movement of the same relative to the tractor frame. The vertical shafts 20 and 21 are journaled respectively in the bearings 22 and 23 at the forward end of the frame 15. The shaft 20 terminates at its lower end in the rearwardly extended fork 24, in which the supporting wheel 16 is journaled. The shaft 21 terminates at its lower end in the fork 26 in which the pilot wheel 17 is journaled.

The pilot wheel 17, supporting wheel 16 and steering post 12 of the tractor are connected as follows: The crank arm 27 on the upper end of the shaft 21 is connected by the link 28 to the crank arm 29 on the upper end of the shaft 20. To this shaft 20 is also fixed a horizontal grooved pulley 30 to which the endless cable 31 is attached. This cable is crossed, and extends to and around the steering post 12. The connection formed by said link 28 and cable 31 transmits any side movement of the pilot wheel 17 to the supporting wheel 16 and the steering wheel of the tractor, and also communicates the movement of said steering wheel to said pilot and supporting wheels. The face of the wheel 16 is beveled and causes said wheel to turn away from the furrow, thus operating the pilot wheel 17 through the link 28 to continually engage the land side of the furrow. The pilot wheel 17 is slightly beveled on the land side to hinder the same from climbing the furrow.

The sub-frame 32, which forms the mounting for the bearing 23, is pivoted at 33 and 34 to the pilot frame 15, thus permitting a vertical movement of the pilot wheel regardless of the position or movement of the frame 15.

In operation, a substantially straight furrow is first plowed, the pilot wheel 17 is placed in the furrow and the tractor arranged in its proper position relative thereto. The pilot wheel follows the furrow as the tractor advances, and any movement of the same caused by a change in the direction of the furrow is transmitted through the link 28 to the supporting wheel 16, and from the pulley 30 through the crossed cable 31 to the steering wheel of the tractor to correspondingly change the direction of the same. The pilot and steering wheels 17 and 16 and the steering wheel of the tractor are directed by the ordinary hand control when turning at the end of the field, or when substantial obstructions are met in operation.

What I claim as new and desire to protect by Letters Patent, is:

1. The combination with a traction vehicle having a rear steering wheel of a pilot frame tiltably mounted on the frame of said vehicle, a supporting wheel for the pilot frame, a pilot wheel on said frame arranged to travel in a previously formed furrow and capable of vertical movement with respect to said supporting wheel and connecting means between the pilot wheel, supporting wheel and steering wheel for synchronizing the movement of said wheels.

2. The combination with a traction vehicle having a rear steering wheel of a pilot frame pivotally mounted on the frame of said traction vehicle, a pilot wheel adapted to travel in a previously formed furrow, a supporting wheel adapted to travel on the land, said pilot and supporting wheels being journaled in said pilot frame and capable of independent vertical movement, and connecting means between the pilot wheel, supporting wheel and steering wheel for correcting side movement of said wheels.

3. An attachment for tractors having a rear steering wheel, comprising a pilot frame pivotally connected on the front end of the traction frame, a supporting wheel journaled in said pilot frame, a sub-frame pivotally attached to the pilot frame, a pilot wheel journaled in said sub-frame, connecting means for transmitting movement between said pilot wheel and supporting wheel, a drum connected with the steering wheel, a horizontal pulley connected with the supporting wheel, and a crossed endless cable adapted to communicate motion between said drum and pulley.

4. The combination with a traction vehicle having a rear steering wheel of a pilot frame tiltably mounted on the frame of said traction vehicle, a pilot wheel on said pilot frame arranged to travel in a previously formed furrow, a beveled supporting wheel for said frame, connecting means between said supporting and pilot wheels, said supporting wheel operating to continually engage the pilot wheel with one side of the furrow, and connecting means between the supporting pilot and steering wheels for synchronizing the movement of said wheels.

5. The combination with a traction vehicle and the steering mechanism therefor, of a pilot frame pivotally mounted on the front of the frame of said vehicle, a beveled supporting wheel for the pilot frame arranged to travel on the land, a sub-frame on said pilot frame capable of vertical movement relative thereto, a pilot wheel journaled in said sub-frame and arranged to travel in a previously formed furrow, connecting means between said pilot wheel and beveled supporting wheel, said supporting wheel being adapted through said connecting means to yieldingly engage said pilot wheel with the land side of a furrow, a horizontal pulley connected with said supporting wheel and an endless crossed cable connecting said pulley and steering mechanism to impart a reverse turn to the steering mechanism in case the pilot wheel departs from a right line.

6. The combination with a traction vehicle and steering mechanism therefor, of a pilot frame tiltably mounted on the frame of said vehicle, a supporting wheel for the pilot frame adapted to travel on the land, a sub-frame pivotally connected to said pilot frame, a pilot wheel journaled vertically in said sub-frame and adapted to travel in a previously formed furrow and means connecting said pilot wheel, supporting wheel and steering mechanism for communicating movement between said parts.

In testimony whereof, I have signed my name to this specification in the presence of two subscribing witnesses.

LESLIE S. HACKNEY.

Witnesses:
ASHLEY COFFMAN,
F. C. CASWELL.

---

Copies of this patent may be obtained for five cents each, by addressing the "Commissioner of Patents, Washington, D. C."